United States Patent Office 3,400,120
Patented Sept. 3, 1968

3,400,120
16α,17α-ETHYLENE-4-PREGNENO PYRAZOLES
John H. Fried, Palo Alto, Calif., assignor to Syntex Corporation, Panama, Panama, a corporation of Panama
No Drawing. Filed Feb. 1, 1966, Ser. No. 523,900
18 Claims. (Cl. 260—239.5)

This invention relates to novel cyclopentanophenanthrene derivatives and to a process for the production thereof. More specifically, this invention relates to 16α,17α-ethylene and 16α,17α-substituted ethylene derivatives of 5-pregneno[3,2-c]-pyrazoles.

The compounds of this invention may be represented by the following formula:

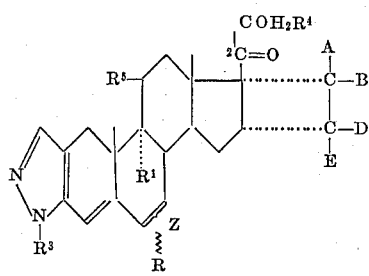

wherein

Z is a carbon-carbon single bond, a carbon-carbon double bond, or the group

bridging the C-6 and C-7 carbon atoms, each of X and Y being hydrogen, chloro or fluoro;
$R^1$ is hydrogen, fluoro or chloro;
$R^2$ is hydrogen, fluoro, chloro or methyl, $R^2$ being in the β-configuration when Z is the group

and $R^2$ being in either the α or β-configuration when Z is a carbon-carbon single bond;
$R^3$ is hydrogen, phenyl, fluorophenyl, nitrophenyl or methoxyphenyl;
$R^4$ is hydrogen, phosphono, tetrahydropyranyl or a hydrocarbon carboxylic acyl group containing less than 12 carbon atoms;
$R^5$ is hydroxy or chloro, $R^1$ being chloro when $R^5$ is chloro;
each of A and B is hydrogen, chloro, fluoro or an alkyl group of from 1 to 4 carbon atoms;
each of D and E is hydrogen, chloro, fluoro, phenyl, an alkyl group of from 1 to 4 carbon atoms, an alkoxy group of from 1 to 4 carbon atoms, or a haloalkyl group of from 1 to 4 carbon atoms; and
A and B or D and E taken together are methylene or difluoromethylene.

The hydrocrabon carboxylic acyl group of the present invention will contain less than 12 carbon atoms and may be of a straight, branched, cyclic or cyclic-aliphatic chain structure. This structure may be saturated, unsaturated, or aromatic and optionally substituted by functional groups such as hydroxy, alkoxy containing up to 5 carbon atoms, acyloxy containing up to 12 carbon atoms, nitro, amino, halogeno, and the like.

Typical esters thus include acetate, propionate, enanthate, benzoate, trimethylacetate, t-butylacetate, phenoxyacetate, cyclopentylpropionate, aminoacetate, β-chloropropionate, adamantoate, and the like.

The compounds represented by the above formula demonstrate hormonal properties characteristic of coricoid and anti-inflammatory agents and are useful in the treatment of conditions which are responsive to such agents, such as rheumatoid arthritis, contact dermatitis, allergies, and the like. The compounds of this invention may be administered via known routes in the usual pharmaceutical compositions and dosages appropriate for the conditions being treated.

The compounds of this invention are prepared in accordance with the following reaction scheme:

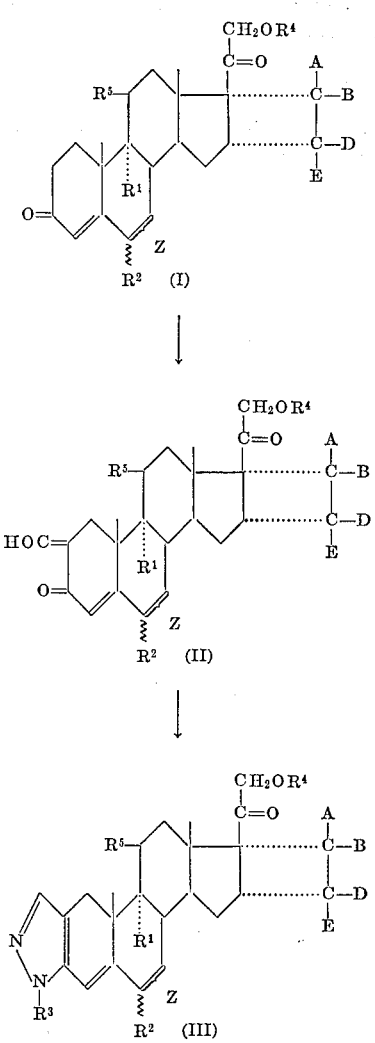

wherein all substituents are as previously defined.

Preparation of the starting materials represented by Formula I is described in copending application Ser. No. 517,954 filed Jan. 3, 1966. Briefly, they are prepared by the photochemical addition of an olefin of the formula

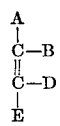

to a $\Delta^{4,16}$-diene of the pregnane series. Thus, a 3,20-diketo-$\Delta^{4,16}$-diene of the pregnane series is converted to the 3-ethylenedioxy compound prior to the photochemical addition of the olefin under U.V. light of wavelength 270–330 mu. Subsequent to the addition, the 3-keto group is regenerated by hydrolysis of the ketal of yield those starting materials of the present invention.

In the practice of the process, the side chain of the starting materials of Formula I is protected during the reaction sequence as through formation of the 21-tetrahydropyranyl ether. Treatment of the 3-keto-$\Delta^4$-ene containing the 16$\alpha$,17$\alpha$-substituted ethylene group of Formula I with ethyl formate and sodium hydride in an inert atmosphere gives the corresponding 2-hydroxymethylene compounds of Formula II. This intermediate is then condensed with a molar equivalent of hydrazine hydrate or a substituted hydrazine hydrochloride and sodium acetate in an aqueous methanolic solution at 0° C. to effect ring closure and give the corresponding 4-pregneno [3,2-c]-pyrazoles of Formula III. Among the substituted hydrazines of the present invention are phenylhydrazine, fluorophenylhydrazine, nitrophenylhydrazine and methoxyphenylhydrazine. Subsequent to the ring closure the tetrahydropyranyl group may be removed by acid hydrolysis to afford the 21-hydroxy compounds. The latter compounds may be esterified via conventional techniques to afford those 21-esters of the present invention.

The following examples will illustrate the present invention, but are not intended to limit the scope thereof. In the naming of the 16$\alpha$,17$\alpha$-ethylene derivatives it is understood that in connection with the substituents D and E, the carbon atom attached to the C–16 carbon atoms of the steroid nucleus is designated as 1', and in connection with the substituents A and B, the carbon atom attached to the C–17 carbon atom of the steroid nucleus is designated as 2'.

Preparation A

To a solution of 5 g. of 11$\beta$,17$\alpha$,21-trihydroxypregn-4-ene-3,20-dione in 200 ml. of chloroform are added 40 ml. of 37% aqueous formaldehyde and 5 ml. of concentrated hydrochloric acid. The mixture is stirred for 48 hours at room temperature and the two layers are then separated. The aqueous layer is extracted with chloroform and the combined organic layer and chloroform extracts are washed with water to neutrality, dried over sodium sulfate and evaporated to dryness to yield 11$\beta$-hydroxy-17,20;20,21-bismethylenedioxypregn-4-ene-3-one which is recrystallized from methanol:ether. A mixture of 1 g. of this material, 2 g. of chloranil and 10 ml. of xylene is refluxed under an atmosphere of nitrogen for 16 hours. The mixture is cooled, washed with a cold 10% sodium hydroxide solution and then with water, dried over sodium sulfate and evaporated under reduced pressure. The residue is chromatographed on neutral alumina and further purified through recrystallization from acetone:hexane to yield 11$\beta$-hydroxy-17,20;20,21-bismethylenedioxypregna-4,6-dien-3-one. To a stirred and refluxing solution of 1 g. of this material in 8 ml. of diethyleneglycol dimethyl ether is added, in a dropwise fashion over a two-hour period, a solution of 30 equivalents of sodium chlorodifluoroacetate in 30 ml. of diethyleneglycol dimethyl ether. At the end of the reaction period, which may be followed by the U.V. spectra, the mixture is filtered and evaporated in vacuo to dryness. The residue is added to 10% methanolic potassium hydroxide and the mixture is heated briefly at reflux and poured into ice water. The solid which forms is collected, washed with water, dried and chromatographed on alumina, eluting with methylene chloride, to yield 6$\alpha$,7$\alpha$-difluoromethylene-11$\beta$-hydroxy-17,20;20,21 - bismethylenedioxypregn-4-en-3-one. One gram of this material in 20 ml. of 60% formic acid is heated at steam bath temperature for one hour. The mixture is cooled, diluted with water and filtered. The solid thus collected is washed with water, dried, and recrystallized from acetone:hexane to yield 6$\alpha$,7$\alpha$-difluoromethylene - 11$\beta$,17$\alpha$,21 - trihydroxypregn-4-ene-3,20-dione. A mixture of 1 g. of this material, 4 ml. of pyridine and 2 ml. of pyridine and 2 ml. of acetic anhydride is allowed to stand at room temperature for 15 hours. The mixture is then poured into ice water and the solid which forms is collected by filtration, washed with water and dried to yield 6$\alpha$,7$\alpha$-difluoromethylene-11$\beta$,17$\alpha$-dihydroxy - 21 - acetoxypregn - 4-ene-3,20-dione which may be further purified by recrystallization from acetone:hexane. To a suspension of 1 g. of the previous compound in 27 ml. of methanol and 1 ml. of water, under nitrogen, is added 1.4 g. of semicarbazide hydrochloride and 0.74 g. of sodium bicarbonate. The mixture is heated at reflux for three hours and then at 45° C. for 20 hours. The suspension is cooled and 36 ml. of water are slowly added. The solid is collected by filtration, washed with water and dried to yield 6$\alpha$,7$\alpha$-difluoromethylene-11$\beta$,17$\alpha$-dihydroxy - 21 - acetoxypregn-4-ene-3,20-bis semicarbazone which is recrystallized from pyridine:methanol. A solution of 1 g. of this material in 20 ml. of acetic acid and 1 ml. of acetic anhydride is heated at reflux under nitrogen for one hour. The reaction mixture is then concentrated under reduced pressure to a volume of about 12 ml. and treated with 6 ml. of water and 3 ml. of pyruvic acid. The mixture is allowed to stand at room temperature for 40 hours and at 60° C. for two hours and is then diluted with water and extracted with chloroform. These extracts are washed with water, dilute potassium bicarbonate solution and water, dried over magnesium sulfate and evaporated to dryness under reduced pressure. The residue is chromatographed on neutral alumina with benzene to yield 6$\alpha$,7$\alpha$-difluoromethylene-11$\beta$ - hydroxy-21-acetoxypregna-4,16-diene-3,20-dione which may be recrystallized from acetone:ether. A mixture of 2.0 g. of this material in 50 ml. of 2-methyl-2-ethyl-1,3-dioxolane and 100 mg. of p-toluenesulfonic acid is heated for one hour. An additional 50 mg. of p-toluenesulfonic acid is added and heated at reflux for another hour while approximately 25 ml. of 2-methyl-2-ethyl-1,3-dioxolane is removed by distallation. The mixture is then cooled, neutralized with pyridine, diluted with water and extracted with chloroform. The extracts are washed to neutrality, dried and evaporated to dryness to yield 3,3-ethylenedioxy-6$\alpha$,7$\alpha$-difluoromethylene-11$\beta$-hydroxy - 21 - acetoxypregna-5,16-dien-20-one which is chromatographed on silica, eluting with ethyl acetate:benzene and recrystallized from methanol:methylene chloride. A mixture of 2.0 g. of the previous compound in 140 ml. of benzene is irradiated with a 70 watt Hanan high pressure mercury vapor lamp with a Pyrex filter at room temperature while bubbling ethylene through the solution. At the end of reaction time which may be determined by U.V. spectroscopy, the reaction mixture is evaporated in vacuo to dryness, chromatographed on silica, and the product eluted with ethyl acetate:benzene to yield 3,3-ethylenedioxy-6$\alpha$,7$\alpha$-difluoromethylene-11$\beta$-hydroxy - 16$\alpha$,17$\alpha$ - ethylene-21-acetoxypregn-5-en-20-one which is recrystallized from methanol:methylene chloride. A mixture of 0.5 g. of this material in 30 ml. of acetone and 50 mg. of p-toluenesulfonic acid is allowed to stand at room temperature for 15 hours. It is then poured into ice water and extracted with ethyl acetate. These extracts are washed with water to neutrality, dried over sodium sulfate and evaporated to dryness. The residue is triturated with ether to yield 6$\alpha$,7$\alpha$ - difluoromethylene-11$\beta$-hydroxy-16$\alpha$,17$\alpha$-ethylene-21-acetoxypregn-4-ene-3,20-dione which is recrystallized from acetone:hexane. One gram of this material is allowed to stand at room temperature for 15 hours with 1 g. of potassium bicarbonate in 10 ml. of water and 90 ml. of methanol. At the end of this time the methanol is evaporated under reduced pressure and the residue is extracted with ethyl acetate and water. Evaporation of the ethyl acetate from these extracts yields 6α,7α-difluoromethylene-11β,21 - dihydroxy-16α,17α-ethylenepregn-4-ene-3,20-dione which ts collected by filtration and recrystallized from acetone:hexane. Two ml. of dihydropyran are added to a solution of 1 g. of this compound in 15 ml. of benzene. About 1 ml. is removed by distillation to remove moisture and 0.4 g. of p-toluenesulfonic acid is added to the cooled solution. This mixture is allowed to stand at room temperature for 4 days, and is then washed with aqueous sodium carbonate solution and water, dried and evaporated. The residue is chromatographed on neutral alumina, eluting with hexane, to yield 6α,7α-difluoromethylene-11β-hydroxy-16α,17α-ethylene-21-tetrahydropyranyloxypregn - 4 - ene-3,20-dione.

Preparation B

To a suspension of 1 g. of 9α-fluoro-11β,17α-dihydroxy-21-acetoxypregn-4-ene-3,20-dione in 27 ml. of methanol and 1 ml. of water, under nitrogen is added 1.4 g. of semicarbazide hydrochloride and 0.74 g. of sodium bicarbonate. The mixture is heated at reflux for three hours and then at 45° C. for 20 hours. The suspension is cooled and 36 ml. of water are slowly added. The solid is collected by filtration, washed with water and dried to yield 9α-fluoro-11β,17α-dihydroxy-21-acetoxypregn-4-ene-3,20-bis-semicarbazone which is recrystallized from pyridine:methanol. A solution of 1 g. of this material in 20 ml. of acetic acid and 1 ml. of acetic anhydride is heated at reflux under nitrogen for 1 hour. The reaction mixture is then concentrated under reduced pressure to a volume of about 12 ml. and treated with 6 ml. of water and 3 ml. of pyruvic acid. The mixture is allowed to stand at room temperature for 40 hours and at 60° C. for 2 hours and is then diluted with water and extracted with chloroform. These extracts are washed with water, dilute potassium bicarbonate solution and water, dried over magnesium sulfate and evaporated to dryness under reduced pressure. The residue is chromatographed on neutral alumina with benzene to yield 9α-fluoro-11β-hydroxy - 21 - acetoxypregna-4,16-diene-3; 20-dione which may be recrystallized from acetone:ether. A mixture of 2.0 g. of this material in 50 ml. of 2-methyl-2-ethyl-1,3-dioxolane and 100 mg. of p-toluenesulfonic acid is heated for one hour. An additional 50 mg. of p-toluenesulfonic acid is added and heated at reflux for another hour while approximately 25 ml. of 2-methyl-2-ethyl-1,3-dioxolane is removed by distillation. The mixture is then cooled, neutralized with pyridine, diluted with water and extracted with chloroform. The extracts are washed to neutrality, dried and evaporated to dryness to yield 3,3-ethylenedioxy-9α-fluoro-11β-hydroxy-21-acetoxypregna-5,16-dien-20-one which is chromatographed on silica, eluting with ethyl acetate:benzene and recrystallized from methanol:methylene chloride. A mixture of 2.0 g. of this material in 140 ml. of benzene is irradiated with a 70 watt Hanan high pressure mercury vapor lamp with a Pyrex filter at room temperature while bubbling ethylene through the solution. At the end of reaction time which may be determined by U.V. spectroscopy, the reaction mixture is evaporated in vacuo to dryness, chromatographed on silica and the product eluted with ethyl acetate:benzene to yield 3,3-ethylenedioxy-9α-fluoro-11β-hydroxy - 16α,17α - ethylene-21-acetoxypregn-5-en-20-one which is recrystallized from methanol:methylene chloride. A mixture of 0.5 g. of this material in 30 ml. of acetone and 50 mg. of p-toluenesulfonic acid is allowed to stand at room temperature for 15 hours. It is then poured into ice water and extracted with ethyl acetate. These extracts are washed with water to neutrality, dried over sodium sulfate and evaporated to dryness. The residue is triturated with ether to yield 9α - fluoro-11β-hydroxy - 16α,17α - ethylene-21-acetoxypregn-4-ene-3,20-dione which is recrystallized from acetone:hexane. One gram of this material is allowed to stand at room temperature for 15 hours with 1 g. of potassium bicarbonate in 10 ml. of water and 90 ml. of methanol. At the end of this time the methanol is evaporated under reduced pressure and the residue is extracted with ethyl acetate and water. Evaporation of the ethyl acetate from these extracts yields 9α-fluoro-11β,21-dihydroxy-16α,17α-ethylenepregn-4-ene-3,20-dione which is collected by filtration and recrystallized from acetone: hexane. Two ml. of dihydropyran are added to a solution of 1 g. of this material in 15 ml. of benzene. About 1 ml. is removed by distillation to remove moisture and 0.4 g. of p-toluenesulfonic acid is added to the cooled solution. This mixture is allowed to stand at room temperature for 4 days and is then washed with aqueous sodium carbonate solution and water, dried and evaporated. The residue is chromatographed on neutral alumina, eluting with hexane, to yield 9α-fluoro-11β-hydroxy-16α,17α-ethylene - 21 - tetrahydropyranyloxypregn-4-ene-3,20-dione.

Using the same conditions described hereinabove the following starting materials, namely 6α,7α-difluoromethylene-9α-fluoro-11β,17α-dihydroxy-21-acetoxypregn-4-ene-3,20-dione, 6α-chloro-11β,17α-dihydroxy-21-acetoxypregn-4-ene-3,20-dione, 6α-fluoro-11β,17α-dihydroxy-21-acetoxypregn-4-ene 3,20-dione, 6α-methyl-11β,17α-dihydroxy-21-acetoxypregn-4-ene-3,20-dione, 6α-methyl-9α-fluoro-11β,17α-dihydroxy-21-acetoxypregn-4-ene-3,20-dione, 6α,9α-difluoro-11β,17α-dihydroxy-21-acetoxypregn-4-ene-3,20-dione, 6α-chloro-9α-fluoro-11β,17α-dihydroxy-21-acetoxypregn-4-ene-3,20-dione, and 6α,7α-difluoromethylene-11β,17α-dihydroxy-21-acetoxypregn-4-ene-3,20-dione, are converted to the corresponding 16α,17α-ethylene-21-tetrahydropyranyloxy compounds.

Using the same procedure and starting materials as set forth in with one exception, namely substituting tetrafluoroethylene for ethylene there are obtained the corresponding 16α,17α-tetrafluoroethylene products. Notably are the following:

9α-fluoro-11β-hydroxy-16α,17α-tetrafluoroethylene-21-tetrahydropyranyloxypregn-4-ene-3,20-dione, 6α-chloro-11β-hydroxy-16α,17α-tetrafluoroethylene-21-tetrahydropyranyloxypregn-4-ene-3,20-dione, 6α-fluoro-11β-hydroxy-16α,17α-tetrafluoroethylene-21-tetrahydropyranyloxypregn-4-ene-3,20-dione, 6α-methyl-11β-hydroxy-16α,17α-tetrafluoroethylene-21-tetrahydropyranyloxypregn-4-ene-3,20-dione, 6α-methyl-9α-fluoro-11β-hydroxy-16α,17α-tetrafluoroethylene-21-tetrahydropyranyloxypregn-4-ene-3,20-dione, 6α,9α-difluoro-11β-hydroxy-16α,17α-tetrafluoroethylene-21-tetrahydropyranyloxypregn-4-ene-3,20-dione, 6α-chloro-9α-fluoro-11β-hydroxy-16α,17α-tetrafluoroethylene-21-tetrahydropyranyloxypregn-4-ene-3,20-dione, 6α,7α-dichloromethylene-16α,17α-tetrafluoroethylene-21-tetrahydropyranyloxpregn-4-ene-3,20-dione, 6α,7α-methylene-16α,17α-tetrafluoroethylene-21-tetrahydropyranyloxpregn-4-ene-3,20-dione, and 6α,7α-difluoromethylene-16α,17α-tetrafluoroethylene-21-tetrahydropyranyloxypregn-4-ene-3,20-dione.

By utilizing 1,1-difluoroethylene in place of ethylene in the above procedure there are obtained the corresponding 16α,17α-(1',1'-difluoro)ethylene compounds. Notably among these are: 6α-methyl-9α-fluoro-11β-hydroxy-16α, 17α-(1',1'-difluoro)-ethylene - 21 - tetrahydropyranyloxypregn-4-ene-3,20-dione, 6-methyl-9α-fluoro-11β - hydroxy-16α,17α-(1',1'-difluoro)-ethylene-21-tetrahydropyranloxypregna-4,6-diene-3,20-dione.

When the above procedure is employed for the starting compounds set forth below and the olefin substituted for ethylene is as indicated below, there are obtained the corresponding products.

| Starting compound | Olefin | Product |
|---|---|---|
| 6α-chloro-11β, 17α-dihydroxy-21-acetoxypregn-4-ene-3, 20-dione. | Butene-2 | 6α-chloro-11β-hydroxy-16α, 17α (1', 2'-dimethyl) ethylene-21-tetrahydro-pyranyloxypregn-4-ene-3, 20-dione. |
| 6α, 7α-difluoromethylene-11β-17α-dihydroxy-21-acetoxy-pregn-4-ene-3, 20-dione. | Allyl chloride | 6zα, 7α-difluromethylene-11β-hydroxy-16α, 17α-(1'-chloromethyl) ethylene-21-tetrahydropyranyloxypregn-4-ene-3, 20-dione. |
| 6α, 7α-methylene-17α-hydroxy-21-acetoxy-pregn-4-ene-3, 20-dione. | 1-chloro-1, 2, 2-trifluoroethylene. | 6α, 7α-methylene-16α, 17α-(1'-chloro-1',2', 2'-trifluoro) ethylene-21-tetrahydropyranyloxypregn-4-ene-3, 20-dione. |
| 9α-fluoro-11β, 17α-dihydroxy-21-acetoxypregn-4-ene-3, 20-dione. | Isobutylene | 9α-fluoro-11β-hydroxy-16α, 17α- (1',1'-dimethyl) -ethylene-21-tetra-hydropyranyloxypregn-4-ene-3,20-dione. |
| 6α-fluoro-11β, 17α-dihydroxy-21-acetoxypregn-4-ene-3,20-dione. | 1,1 dimethoxyethylene. | 6α-fluoro-11β-hydroxy-16α, 17α (1',1'-dimethoxy) ethylene-21-tetrahydropyranyloxy-pregn-4-ene-3,20-dione. |
| 6α, 7α-difluoromethylene-11β, 17α-dihydroxy-21-acetoxypregn-4-ene-3, 20-dione. | Vinyl acetate | 6α, 7α-difluoromethylene-11β-hydroxy-16α, 17α-(1' acetoxy) ethylene-21-tetrahydropyranyloxypregn-4-ene-3,20-dione. |
| 11β, 17α-dihydroxy-21-acetoxypregn-4-ene-3,20-dione. | Styrene | 11β-hydroxy-16α, 17α-(1'-phenyl) ethylene-21-tetrahydropyranyloxypregn-4-ene-3,20-dione. |

Using allene and 1,1-difluoroallene in the above procedure there is obtained mixtures of the 16α,17α-(1'-methylene) and 16α,17α-(2'-methylene) products which are separated by column chromatography. In a similar reaction the thus-obtained 16,17α(1'-difluoromethylene) and 16α,17α(2'-difluoromethylene) products are obtained and separated by column chromatography.

Preparation C

One gram of 6α,9α-difluoro-11β,21-dihydroxy-16α,17α-ethylenepregn-4-ene-3,20-dione and 2 g. of chloranil in 50 ml. of t-butanol are heated at reflux for 8 hours. The cooled reaction mixture is filtered and the solid thus separated is washed with a large volume of ethyl acetate. The combined filtrate and washings are in turn washed with cold 10% aqueous sodium hydroxide until the washings are colorless, dried over sodium sulfate and evaporated to dryness to yield 6,9α-difluoro-11β,21-dihydroxy-16α,17α-ethylenepregna-4,6-diene-3,20-dione which may be further purified through clarification with alumina and recrystallization from methylene chloride:ether.

Using the same procedure the following Δ$^{4,6}$-analogs are prepared. Notably among these are: 6-methyl-9α-fluoro-11β,21-dihydroxy-16α,17α-ethylenepregna-4,6-diene-3,20-dione; 6-methyl-9α-fluoro-11β,21-dihydroxy-16α,17α-tetrafluoroethylenepregna-4,6-diene-3,20-dione; and 6-methyl-9α-fluoro-11β,21-dihydroxy-16α,17α-(1',1'-difluoro)ethylenepregna-4,6-diene-3,20-dione.

EXAMPLE 1

To a stirred solution of 3 g. of 9α-fluoro-11β-hydroxy-16α,17α-ethylene-21-tetrahydropyranyloxypregn-4-ene-3,20-dione in 60 ml. of anhydrous benzene is added, with cooling and under nitrogen, a suspension of 3 ml. of ethyl formate and 1.3 g. of sodium hydride in mineral oil. The mixture is stirred at room temperature for 24 hours and hexane is then added until complete precipitation occurs. The solid which forms is collected, dried under vacuum and suspended in aqueous hydrochloric acid. This suspension is stirred at room temperature for half an hour and then filtered. The solid thus collected is washed with water and then dried to yield 2-hydroxymethylene-9α-fluoro-11β-hydroxy-16α,17α-ethylene-21-tetrahydropyranyloxypregn-4-ene-3,20-dione which is recrystallized from methylene chloride:hexane.

A mixture of the 2-hydroxymethylene derivative, 2 g. of sodium acetate, 100 ml. of aqueous methanol and 1 ml. of phenylhydrazine hydrochloride is allowed to stand under nitrogen at 0° C. for 24 hours. Acetic acid (2 ml.) is added and the mixture is allowed to stand for another 4 hours. The reaction mixture is diluted with ethyl acetate and washed with 2N sodium hydroxide and water. The ethyl acetate extracts are dried, concentrated and chromatographed over silica, eluting with benzene to afford 9α - fluoro - 11β - hydroxy-16α,17α-ethylene-21-tetrahydropyranyloxy-2'-phenyl-4-pregneno[3,2-c] pyrazole.

To a solution of 1 g. of 9α-fluoro-11β-hydroxy-16α,17α-ethylene - 21 - tetrahydropyranyloxy-2'-phenyl-4-pregneno [3,2-c] pyrazole in 30 ml. of acetic acid is added 0.5 ml. of 2N hydrochloric acid. The mixture is allowed to stand 5 hours at room temperature and then diluted with ice water and extracted with methylene chloride. The extracts are washed with water to neutrality, dried over sodium sulfate and evaporated to dryness to yield 9α-fluoro-11β, 21 - dihydroxy - 16α,17α - ethylene-2'-phenyl-4-pregneno [3,2-c] pyrazole which is recrystallized from acetone: hexane.

Using the above procedure the following compounds, namely 6α,7α - difluoromethylene-9α-fluoro-11β-hydroxy-16α,17α - ethylene - 21 - tetrahydropyranylpregn-4-ene-3, 20-dione; 6α,7α-difluoromethylene-9α-fluoro-11β-hydroxy-16α,17α - tetrafluoroethylene - 21 - acetoxypregn-4-ene-3, 20-dione; 6α,7α-difluoromethylene-11β-hydroxy-16α,17α-ethylene - 21-tetrahydropyranyloxypregn-4-ene-3,20-dione; 6α,7α - difluoromethylene - 11β - hydroxy - 16α,17α-tetrafluoroethylene - 21 - tetrahydropyranyloxypregn - 4-ene-3, 20 - dione; 6α,9α-difluoro-11β-hydroxy-16α,17α-ethylene-21 - tetrahydropyranyloxypregn-4-ene-3,20-dione; 6,9α-difluoro - 11β - hydroxy - 16α,17α - tetrafluoroethylene-21-tetrahydropyranyloxypregna-4,6-diene-3,20-dione; and 9α-fluoro-11β - hydroxy-16α,17α-tetrafluoroethylene-21-tetrahydropyranyloxypregn-4-ene-3,20-dione; 6α - fluoro-11β-hydroxy - 16α,17α-(2'-methylene)-ethylene-21-tetrahydropyranyloxypregn - 4 - ene - 3,20-dione; 6α-chloro-11β-hydroxy - 16α,17α(1',2'-dimethyl)-ethylene - 21-tetrahydropyanyloxypregn-4-ene-3,20-dione; 6α,7α - difluoromethylene - 11β - hydroxy - 16α,17α-(1'-chloromethyl)ethylene-21 - tetrahydropyranyloxy-pregn-4-ene-3,20-dione; 6α,7α-methylene - 11β - hydroxy - 16α,17α(1'-chloro-1',2',2'-trifluoro)ethylene - 21 - tetrahydropyanyloxy-pregn-4-ene-3, 20 - dione; 6α,9α - difluoro - 11β-hydroxy-16α,17α-(2'-difluoromethylene)ethylene-21-tetrahydropyranyloxy-pregn-4-ene-3,20-dione; 9α-fluoro - 11β - hydroxy-16α,17α-(1', 1' - dimethtyl)ethylene - 21 - tetrahydropyranyloxypregn-4 - ene - 3,20 - dione and 6α-fluoro-11β-hydroxy-16α,17α (1',1' - dimethoxy)ethylene - 21 - tetrahydropyranyloxypregn - 4 - ene - 3,20-dione; 6α-methyl-9α-fluoro-11β-hydroxy - 16α,17α - (ethylene)-21 - tetrahydropyranyloxypregn-4-ene-3,20-dione are converted to their respective 2'-phenyl-4-pregneno[3,2-c] pyrazole analogs, namely; 6α, 7α-difluoromethylene - 11β,21 - dihydroxy-16α,17α-ethylene-2'-phenyl-4-pregneno[3,2-c] pyrazole; 6α,7α-difluoromethylene - 9α - fluoro-11β,21 - dihydroxy-16α,17α-tetrafluoroethylene - 2' - phenyl - 4 - pregneno[3,2-c] pyrazole; 6α,7α-difluoromethylene - 11β,21 - dihydroxy - 16α,17α-ethylene-2'-phenyl-4-pregneno[3,2-c] pyrazole; 6α,7α-difluoromethylene - 11β,21 - dihydroxy-16α,17α-tetrafluoroethylene - 2' - phenyl - 4 - pregneno[3,2-c] pyrazole; 6α, 9α - difluoro - 11β,21 - dihydroxy - 16α,17α - ethylene-2'-phenyl-4-pregneno[3,2-c] pyrazole; 6α,9α - difluoro-11β, 21 - dihydroxy-16α,17α - tetrafluoroethylene-2'-phenyl-4-pregneno[3,2-c] pyrazole; 9α - fluoro-11β,21-dihydroxy-16α,17α-tetrafluoroethylene - 2'-phenyl-4-pregneno[3,2-c] pyrazole; 6α-fluoro-11β,21-dihydroxy-16α,17α-(2'-methylene)ethylene - 2' - phenyl - 4 - pregneno[3,2-c] pyrazole; 6α - chloro - 11β,21-dihydroxy-16α,17α-(1',2'-dimethyl) ethylene - 2' - phenyl - 4 - pregneno[3,2-c] pyrazole; 6α, 7α - difluoromethylene - 11β,21 - dihydroxy-16α,17α-(1'-chloromethyl)ethylene-2'-phenyl-4-pregneno[3,2-c] pyrazole; 6α,7α - methylene - 11β,21-dihydroxy-16α,17α-(1'-chloro-1',2',2'-trifluoro)ethylene-2'-phenyl - 4 - pregneno [3,2-c] pyrazole; 6α,9α - difluoro-11β,21-dihydroxy-16α, 17α-(2'-difluoromethylene)ethylene - 2' - phenyl - 4-pregneno[3,2-c] pyrazole; 9α - fluoro-11β,21-dihydroxy-16α, 17α-(1',1'-dimethyl)ethylene - 2' - phenyl - 4 - pregneno [3,2-c] pyrazole; and 6α - fluoro-11β,21 - dihydroxy-16α, 17α-(1',1'-dimethoxy)ethylene - 2 - phenyl - 4 - pregneno [3,2-c] pyrazole, 6α - methyl-9α-fluoro-11β,21-dihydroxy-16α,17α-ethylene - 2' - phenyl-4-pregneno[3,2-c] pyrazole, respectively.

By utilizing an equivalent amount of p-fluorophenylhydrazine hydrochloride in place of phenylhydrazine hydrochloride, there are obtained the corresponding 2'-(p-fluorophenyl)-4-pregneno[3,2-c] pyrazoles, notably are the following:

6α,7α-difluoromethylene-11β,21-dihydroxy-16α,17α-ethylene-2'-(p-fluorophenyl)-4-pregneno[3,2-c]-pyrazole;
6α,7α-difluoromethylene-9α-fluoro-11β,21-dihydroxy-16α, 17α-ethylene-2'-(p-fluorophenyl)-4-pregneno[3,2-c]-pyrazole;
6α,9α-difluoro-11β,21-dihydroxy-16α,17α-ethylene-2'-(p-fluorophenyl)-4-pregneno[3,2-c]-pyrazole;
6α,7α-difluoromethylene-11β,21-dihydroxy-16α,17α-tetrafluoroethylene-2'-(p-fluorophenyl)-4-pregneno [3,2-c]-pyrazole;
6α,7α-difluoromethylene-9α-fluoro-11β,21-dihydroxy-16α,17α-tetrafluoroethylene-2'-(fluorophenyl)-4-pregneno[3,2-c]-pyrazole;
6α,9α-difluoro-11β,21-dihydroxy-16α,17α-tetrafluoroethylene-2'-(p-fluorophenyl)-4-pregneno[3,2-c] pyrazole;
9α-fluoro-11β,21-dihydroxy-16α,17α-tetrafluoroethylene-2'-(p-fluorophenyl)-4-pregneno[3,2-c] pyrazole;
6α,7α-difluoromethylene-6β-fluoro-11β,21-dihydroxy-16α,17α-ethylene-2'1(p-fluorophenyl)-4-pregneno [3,2-c] pyrazole; and
6α,7α-difluoromethylene-6β-fluoro-11β,21-dihydroxy-16α,17α-tertafluoroethylene-2'-(p-fluorophenyl)-4-pregneno[3,2-c]-pyrazole;
6α-methyl-9α-fluoro-11β,21-dihydroxy-16α,17α-(1',1'-difluoro)ethylene-2'-(p-fluorophenyl)-4-pregneno[3,2-c] pyrazole,
6α-fluoro-11β,21-dihydroxy-16α,17α-(ethylene)-2'-(p-fluorophenyl)-4-pregneno[3,2-c] pyrazole;
6α-fluoro-9α,11β-dichloro-21-hydroxy-16α,17α-ethylene-2'-(p-fluorophenyl)-4-pregneno[3,2-c] pyrazole, respectively.
6-methyl-9α-fluoro-11β,21-dihydroxy-16α,17α-ethylene-2-(p-fluorophenyl)-4,6-pregnadieno[3,2-c] pyrazole;
6-methyl-9α-fluoro-11β,21-dihydroxy-16α,17α-(1',1'-difluoro)ethylene-2'-(p-fluorophenyl)-4,6-pergnadieno[3,2-c] pyrazole;
6-methyl-9α-fluoro-11β,21-dihydroxy-16α,17α-tetrafluoroethylene-2'-(p-fluorophenyl)-4,6-pregnadieno [3,2-c] pyrazole; and
6,9α-difluoro-11β,21-dihydroxy-16α,17α-ethylene-2'-(p-fluorophenyl)-4,6-pregnadieno[3,2-c] pyrazole.

By utilizing an equivalent amount of hydrazine hydrate in place of phenylhydrazine hydrochloride, there are obtained the corresponding 4-pregneno[3,2-c] pyrazoles, notably the following:

6α,7α-difluoromethylene-11β,21-dihydroxy-16α,17α-ethylene-4-pregneno[3,2-c] pyrazole;
6α,7α-difluoromethylene-9α-fluoro-11β,21-dihydroxy-16α,17α-ethylene-4-pregneno[3,2-c] pyrazole;
6α,7α-difluoromethylene-6β-fluoro-11β,21-dihydroxy-16α,17α-ethylene-4-pregneno[3,2-c] pyrazole;
9α-fluoro-11β,21-dihydroxy-16α,17α-ethylene-4-pregneno [3,2-c] pyrazole;
6α,7α-difluoromethylene-9α-fluoro-11β,21-dihydroxy-16α,17α-tetrafluoroethylene-4-pregneno [3,2-c] pyrazole; and
6α,7α-difluoromethylene-6β-fluoro-11β,21-dihydroxy-16α,17α-tetrafluoroethylene-4-pregneno [3,2-c] pyrazole.

In a similar fashion the use of p-nitrophenyl hydrazine hydrochloride and p-methoxyphenyl hydrazine hydrochloride in place of phenylhydrazine hydrachloride yields the corresponding 2'-(p-nitrophenyl)-and 2'-(p-methoxyphenyl)-4-pregneno[3,2-c] pyrazoles, respectively.

EXAMPLE 2

A mixture of 1 g. of 6α,7α-difluoromethylene-11β,21-dihydroxy - 16α,17α - ethylene - 2' - (p - fluorophenyl)-4-pregneno[3,2-c] pyrazole, 4 ml. of pyridine and 2 ml. of acetic anhydride is allowed to stand at room temperature for 15 hours. The mixture is then poured into ice water and the solid which forms is collected by filtration, washed with water and dried to yield 6α,7α-difluoromethylene - 11β - hydroxy - 16α,17α - ethylene - 21 - acetoxy - 2' - (p - fluorophenyl) - 4 - pregneno[3,2-c] pyrazole which may be further purified through recrystallization from acetone:hexane.

In a similar fashion by utilizing the same procedure the 21-hydroxy compounds of Example 1 are converted to their 21acetates. Notably among these are:

6α,7α-difluoromethylene-11β-hydroxy-16α,17α-tetrafluoroethylene-21-acetoxy-2'-(p-fluorophenyl)-4-pregneno[3,2-] pyrazole;
6α,7α-difluoromethylene-6β-fluoro-11β-hydroxy-16α,17α-ethylene-21-acetoxy-2'-(p-fluorophenyl)-4-pregneno [3,2-c] pyrazole;
6α,7α-difluoromethylene-6β-fluoro-11β-hydroxy-16α,17α-tetrafluoroethylene-21-acetoxy-2'-(p-fluorophenyl)-4-pregneno[3,2-c] pyrazole;
6α,7α-difluoromethylene-11β-hydroxy-16α,17α-ethylene-21-acetoxy-2'-phenyl-4-pregneno[3,2-c] pyrazole;
6α,7α-difluoromethylene-11β-hydroxy-16α,17α-tetrafluoroethylene-21-acetoxy-2'-phenyl-4-pregneno [3,2-c] pyrazole;
6α,7α-difluoromethylene-6β-fluoro-11β-hydroxy-16α,17α-ethylene-21-acetoxy-2'-phenyl-4-pregneno[3,2-c] pyrazole;
6α,7α-difluoromethylene-6β-fluoro-11β-hydroxy-16α,17α-tetrafluoroethylene-21-acetoxy-2'-phenyl-4-pregneno [3,2-c] pyrazole.

In a similar fashion by utilizing anhydrides of other hydrocarbon carboxylic acids of less than 12 carbon atoms in place of acetic anhydride, the corresponding 21-acyloxy derivatives are obtained.

EXAMPLE 3

A mixture of 2 g. of 6α,7α-difluoromethylene-9α-fluoro-11β,21 - dihydroxy - 16α,17α -ethylene - 2' - (p - fluorophenyl)-4-pregneno[3,2-c] pyrazole in 8 ml. of pyridine and 4 ml. of trimethylacetyl chloride is heated at steam bath temperatures for one hour. The mixture is then poured into ice water. The solid which forms is collected by filtration, washed with water and dried to yield 6α,7α-difluoromethylene - 9α - fluoro - 11β - hydroxy - 16α,17α-ethylene - 21 - trimethylacetoxy - 2' - (p - fluorophenyl)-4-pregneno[3,2-c] pyrazole which may be recrystallized from methylene chloride:hexane.

Similarly there is obtained from the corresponding starting materials 6α,7α-difluoromethylene-11β-hydroxy-16α,17α - tetrafluoroethylene - 21 - trimethylacetoxy-4-pregneno[3,2-c] pyrazole, 6α,9α-difluoro-11β-hydroxy-16α,17α-ethylene - 21 - trimethylacetoxy - 2' - (p-fluorophenyl) - 4 - pregneno - [3,2-c] pyrazole and 6α-fluoro-9α,11β-dichloro-16α,17α-ethylene - 21 - trimethylacetoxy-2'-(p-fluorophenyl)-4-pregneno[3,2-c] pyrazole and the like esters of the various other compounds of the present invention.

EXAMPLE 4

To a cooled solution (0° C.) of 3.4 g. of 6α,7α-difluoromethylene - 11β,21 - dihydroxy-16α,17α-ethylene-2'-(p-fluorophenyl)-4-pregneno[3,2-c]-pyrazole in 20 ml. of 9:1 chloroform:pyridine is added in small portions 1.4 g. of methanesulfonyl chloride. The reaction mixture is allowed to stand for 14 hours at 0° C. and is then washed with dilute hydrochloric acid, water and sodium bicarbonate solution. The chloroform is removed by evaporation under reduced pressure and the residue is dissolved in 20 ml. of acetone treated at room temperature and under stirring with 4 g. of sodium iodide. Sodium thiosulfate solution is added, followed by water. The solid is collected and dried to yield 6α,7α-difluoromethylene - 11β - hydroxy-16α,17α-ethylene-21-iodo-2'-(p-fluorophenyl)-4-pregneno-[3,2-c] pyrazole. A mixture of 1 g. of the above 21-iodo intermediate and 1.1 molar equivalents of silver monobasic phosphate in 60 ml. of acetonitrile is heated at reflux for 2 hours. The mixture is then filtered and evaporated to dryness to yield 6α,7α-difluoromethylene - 11β - hydroxy-16α,17α-ethylene - 21 - phosphato - 2' - (p-fluorophenyl)-4-pregneno[3,2-c] pyrazole which may be crystallized from methanol ethyl acetate.

In a similar fashion other 21-hydroxy-compounds of the present invention are converted to the corresponding 21-iodo intermediate and then to the corresponding 21-phosphate compounds.

What is claimed is:

1. A compound of the formula

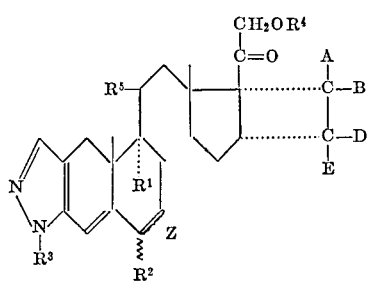

wherein

Z is a carbon-carbon single bond, a carbon-carbon double bond, or the group

bridging the C-6 and C-7 carbon atoms, each of X and Y being hydrogen, chloro or fluoro;

$R^1$ is hydrogen, fluoro or chloro;

$R^2$ is hydrogen, chloro, fluoro or methyl;

$R^3$ is hydrogen, phenyl, fluorophenyl, nitrophenyl or methoxyphenyl;

$R^4$ is hydrogen, phosphono, tetrahydropyranyl, or a hydrocarbon carboxylic acyl group containing less than 12 carbon atoms;

$R^5$ is hydroxy or chloro, $R^1$ being chloro when $R^5$ is chloro;

each of A and B is hydrogen, chloro, fluoro or an alkyl group of from 1 to 4 carbon atoms;

each of D and E is hydrogen, chloro, fluoro, phenyl, an alkyl group of from 1 to 4 carbon atoms, an alkoxy group of from 1 to 4 carbon atoms, or a haloalkyl group of from 1 to 4 carbon atoms; and A and B or D and E taken together are methylene or difluoromethylene.

2. Compound according to claim 1 wherein
$R^3$ is hydrogen, phenyl or p-fluorophenyl;
$R^5$ is hydroxy; and
each of A, B, D and E is hydrogen.

3. Compound according to claim 2 wherein
$R^1$ is fluoro;
$R^2$ is hydrogen;
$R^3$ is p-fluorophenyl;
$R^4$ is hydrogen; and
Z is difluoromethylene.

4. Compound according to claim 2 wherein
$R^1$ is fluoro;
$R^2$ is hydrogen;
$R^3$ is phenyl;
$R^4$ is hydrogen; and
Z is difluoromethylene.

5. Compound according to claim 2 wherein
$R^1$ is hydrogen;
$R^2$ is fluoro;
$R^3$ is phenyl;
$R^4$ is hydrogen; and
Z is a carbon-carbon single bond.

6. Compound according to claim 2 wherein
$R^1$ is fluoro;
$R^2$ is hydrogen;
$R^3$ is p-fluorophenyl;
$R^4$ is hydrogen; and
Z is a carbon-carbon single bond.

7. Compound according to claim 2 wherein
each of $R^1$ and $R^2$ is fluoro;
$R^3$ is p-fluorophenyl;
$R^4$ is hydrogen or pivalyl; and
Z is a carbon-carbon single bond or a carbon-carbon double bond.

8. Compound according to claim 2 wherein
each of $R^1$ and $R^2$ is hydrogen;
$R^3$ is p-fluorophenyl;
$R^4$ is hydrogen; and
Z is a carbon-carbon single bond.

9. Compound according to claim 2 wherein
$R^1$ is fluoro;
$R^2$ is methyl;
$R^3$ is phenyl;
$R^4$ is hydrogen; and
Z is a carbon-carbon single bond.

10. Compound according to claim 2 wherein
$R^1$ is fluoro;
$R^2$ is methyl;
$R^3$ is p-fluorophenyl;
$R^4$ is hydrogen; and
Z is a carbon-carbon double bond.

11. Compound according to claim 1 wherein
$R^3$ is hydrogen, phenyl or p-fluorophenyl;
$R^5$ is hydroxy; and
each of A, B, D and E is fluoro.

12. Compound according to claim 11 wherein
$R^1$ is fluoro;
$R^2$ is hydrogen;
$R^3$ is p-fluorophenyl;
$R^4$ is hydrogen; and
Z is difluoromethylene.

13. Compound according to claim 11 wherein
$R^1$ is fluoro;
$R^2$ is methyl;
$R^3$ is p-fluorophenyl;
$R^4$ is hydrogen or pivalyl; and
Z is a carbon-carbon double bond.

14. Compound according to claim 11 wherein
$R^1$ is fluoro;
$R^2$ is methyl;
$R^3$ is p-fluorophenyl;
$R^4$ is hydrogen or pivalyl; and
Z is a carbon-carbon single bond.

15. Compound according to claim 1 wherein
$R^3$ is hydrogen, phenyl or p-fluorophenyl;
$R^5$ is hydroxy;
each of A and B is hydrogen; and
each of D and E is fluoro.

16. Compound according to claim 15 wherein
$R^1$ is fluoro;
$R^2$ is methyl;
$R^3$ is p-fluorophenyl;
$R^4$ is hydrogen; and
Z is a carbon-carbon double bond.

17. Compound according to claim 1 wherein
$R^1$ is chloro;
$R^2$ is fluoro;
$R^3$ is p-fluorophenyl;
$R^4$ is hydrogen or pivalyl;
$R^5$ is chloro; and
Z is a carbon-carbon single bond.

18. Compound according to claim 11 wherein
$R^1$ is hydrogen;
$R^2$ is methyl;
$R^3$ is p-fluorophenyl;
$R^4$ is hydrogen or pivalyl; and
Z is a carbon-carbon double bond.

References Cited

UNITED STATES PATENTS 3,257,385  6/1966  Hirschmann et al. ___ 260—239.5

H. A. FRENCH, *Primary Examiner.*

UNITED STATES PATENT OFFICE
CERTIFICATE OF CORRECTION

Patent No. 3,400,120                      September 3, 1968

John H. Fried

It is certified that error appears in the above identified patent and that said Letters Patent are hereby corrected as shown below:

Column 1, line 13, "5-pregneno" should read -- 4-pregneno --; lines 16 to 27, and column 11, lines 35 to 47, the formula, each occurrence, should appear as shown below:

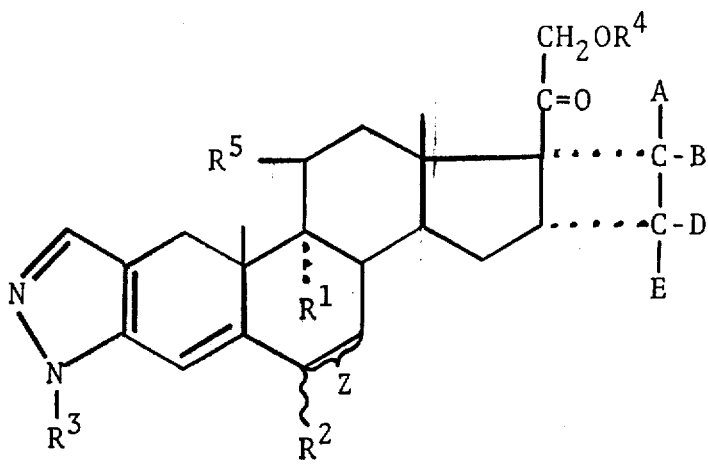

Column 2, line 1, "cori" should read -- corti --; line 6, "of yield" should read -- to yield --. Column 4, lines 1 and 2, "6α,7α-difluoromethylene-11β,17α,21-trihydroxypregn-4-dried, and recrystallized from acetone:hexane to yield" should read -- dried, and recrystallized from acetone: hexane to yield 6α,7α-difluoromethylene-11β,17α,21-trihydroxypregn-4- --. Column 6, lines 61 and 63, "tetrahydropyranyloxpregn-", each occurrence, should read -- tetrahydropyranyloxypregn- --. Column 9, line 41, "-2′1(p-fluorophenyl)" should read -- 2′-(p-fluorophenyl) --; line 55, "2-(p-fluorophenyl)" should read -- 2′-(p-fluorophenyl) --.

Signed and sealed this 24th day of February 1970.

(SEAL)
Attest:

EDWARD M. FLETCHER, JR.            WILLIAM E. SCHUYLER, JR.
Attesting Officer                  Commissioner of Patents